Sept. 7, 1965  M. DESCARSIN  3,205,292
HEATING AND MELTING PROCESS OF VITREOUS
MATERIALS AND FURNACE THEREFOR
Filed June 22, 1960  5 Sheets-Sheet 2

INVENTOR.
MAURICE DESCARSIN
BY
Bauer and Seymour
ATTORNEYS

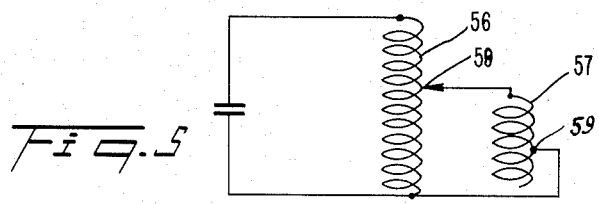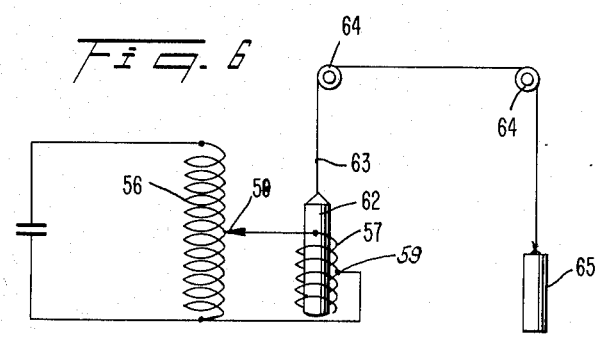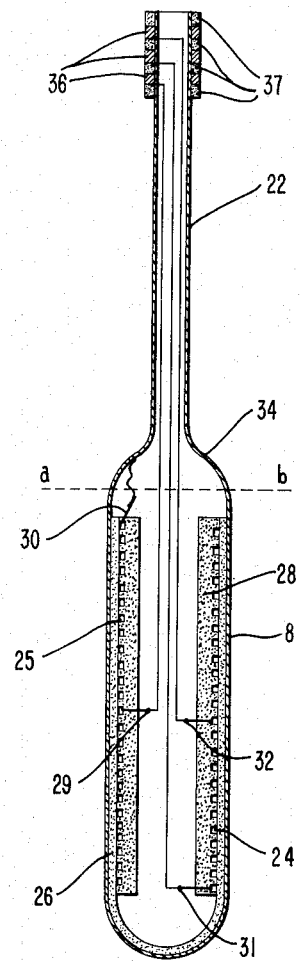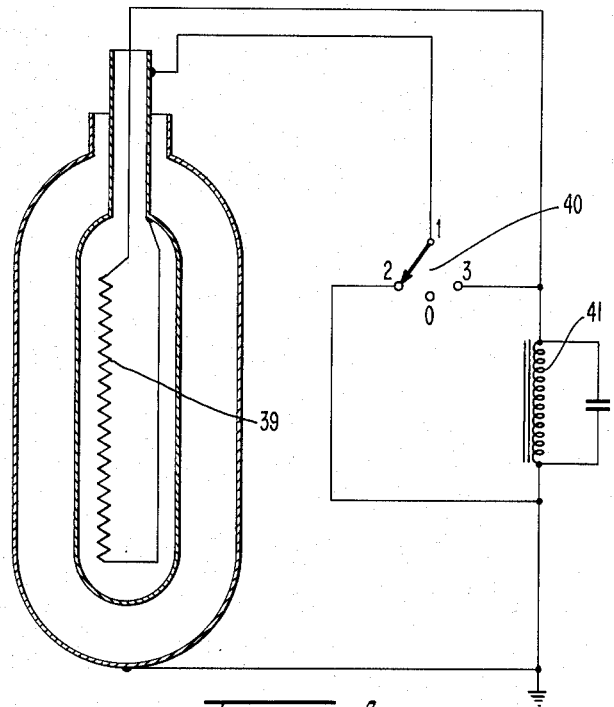

INVENTOR.
MAURICE DESCARSIN 3,205,292
HEATING AND MELTING PROCESS OF VITREOUS MATERIALS AND FURNACE THEREFOR
Maurice Descarsin, Paris, France, assignor, by mesne assignments, to Societe des Verreries Industrielles Reunies du Loing, Paris, France
Filed June 22, 1960, Ser. No. 37,892
Claims priority, application France, June 26, 1959, 798,496, Patent 1,237,883; June 9, 1960, 829,518
20 Claims. (Cl. 13—6)

The present invention relates to fusing vitreous materials, particularly optical glass. It is also applicable to other vitreous materials which exhibit electrical conductivity. It will be described in its relation to the manufacture of optical glass.

The making of optical glass requires exact conditions of fusion and finding, a precisely controlled regimen, which is not attainable by prior methods. The fusion mass should have exact temperature control. It is also desirable to have an intimate mixture of the fusion mass but too much use of mechanical agitators produces undesirable differences in temperature, just as a transfer of the mass from a melting to a fining zone does.

The present invention melts and fines the glass in a single vessel without mechanical agitation.

In the novel process, the crude materials are placed in a space between two metal walls which are electrically insulated from each other but constitute the two plates of a condenser which are charged with high frequency current so that the vitreous raw material forms the condenser dielectric and is heated by dielectric loss. When this heating by dielectric loss has sufficiently raised the temperature the mas becomes conductive and carries current by Joule effect.

The novel furnace may include a platinum or platinum alloy crucible, of cylindrical or truncated conical form, and an inner electrode or plate, of platinum or platinum alloy, electrically insulated from the crucible. The crucible and plate are both the plates of a condenser and the electrodes of a Joule effect cell. As a condenser it heats by dielectric loss and as a Joule effect cell the vitreous mass acts as a self-heating resistance between electrodes. At first the mass is heated only by dielectric loss, but as temperature rises and the conductivity of the mass increases, current flows between the plates through the mass and heating by Joule effect supplements the heating by dielectric loss.

The crucible and the interior plate or electrode may be carried to a temperature that can be controlled exactly by, e.g., resistances placed near their surfaces or by high frequency induction. Thus, in its most complex form the apparatus may involve four types of heating, by resistance, by induction, by dielectric loss and by Joule effect. In one form of the invention, the glass may be controlled exactly in temperature by Joule effect and dielectric loss, and the crucible may be maintained at a selected temperature by induction or resistance heating.

The preferred system comprises the use of separate heating means, one for the crucible and another for the mass of vitreous material in it. The several heating systems are preferably independent and independently controllable either manually, or automatically according to a preselected schedule.

The flexibility of this system is superior: The mass may be heated directly and uniformly by dielectric loss; as soon as the temperature of the mass is high enough heating by Joule effect can be instituted by closing a switch connected to a source of current of the type ordinarily used for glass production by Joule effect; the two modes of heating may be used together, or independently during different times or phases of the process; the temperatures of crucible and core electrode can be regulated independently or simultaneously with precision; by independent manipulation of one or more of the heating means, convection currents can be generated or controlled so as to homogenize the mass without mechanical agitation or stirring; a higher power per unit of volume can be employed than in known processes; the crucible and core can have shapes diverging axially so as to distribute the temperatures in the mass, by dielectric loss and/or Joule effect, according to a selected scale. Thus, if the crucible and core are cylindrical the input of calories is almost uniform from top to bottom. If one of the crucible and core is cylindrical and the other is conoidal the intensity of heating will be varied by the distance between them at each level. Thus, if the crucible is cylindrical and the core is a truncated cone (FIG. 3) the intensity of heating will decrease from the large to the small base of the cone.

The intensity of heating can also be varied along the axis of the furnace to produce greater intensity in the upper levels, even with electrodes of which the distance is constant through the whole height, by providing the crucible with a reflecting dome having the smallest convenient opening for feeding. One may also distribute the heating elements along the crucible or core to achieve a like result. For example, if the heating is by resistances, one may concentrate the stronger heating elements about the upper part of the crucible, or about that part which will produce the best result. When heating is by induction one may arrange the coils in sections so that the sections can be shunted out as desired, or the coils may be arranged in different numbers about different parts or at different distances from the crucible. Similarly, the core can have its parts arranged for different heating in different places, especially providing hotter heating at the top during the fusion of the raw materials. This can be provided for by including a plurality of resistances along the length of the core connected in series or parallel with connections for shunting out sections at will, or providing different temperatures at the radiating surfaces.

The current density, by Joule effect, can be limited in the molten bath, manually or automatically to the maximum value compatible with the quality of glass desired. One effective method is to couple one or more of the resistances in series with the resistance constituted by the glass itself.

The flexibility is such that one may correlate the temperatures of the electrodes (plates) by zones and sequences of temperatures, and by resistances, by dielectric loss and by direct Joule effect to obtain in every phase of the process the optimum temperatures for the product desired. Particularly valuable is the capacity of the system to produce, at certain times, controllable convection currents which achieve a thermal working and stirring of the mass within precisely controlled limits producing maximum homogeneity without mechanical mixing.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

All drawings are diagrammatic.

In the drawings, wherein like reference characters refer to like parts throughout the several views, FIG. 1 is an elevation partly in section of apparatus of a crucible heated by induction;

FIGS. 5 and 6 are electrical diagrams for induction coils useful in selective heating of parts of the furnace;

FIG. 7 illustrates in vertical section a construction providing variable heating for different parts of the core;

FIG. 8 is a simple diagram of the method of activating the apparatus of FIG. 7;

Figure 1:
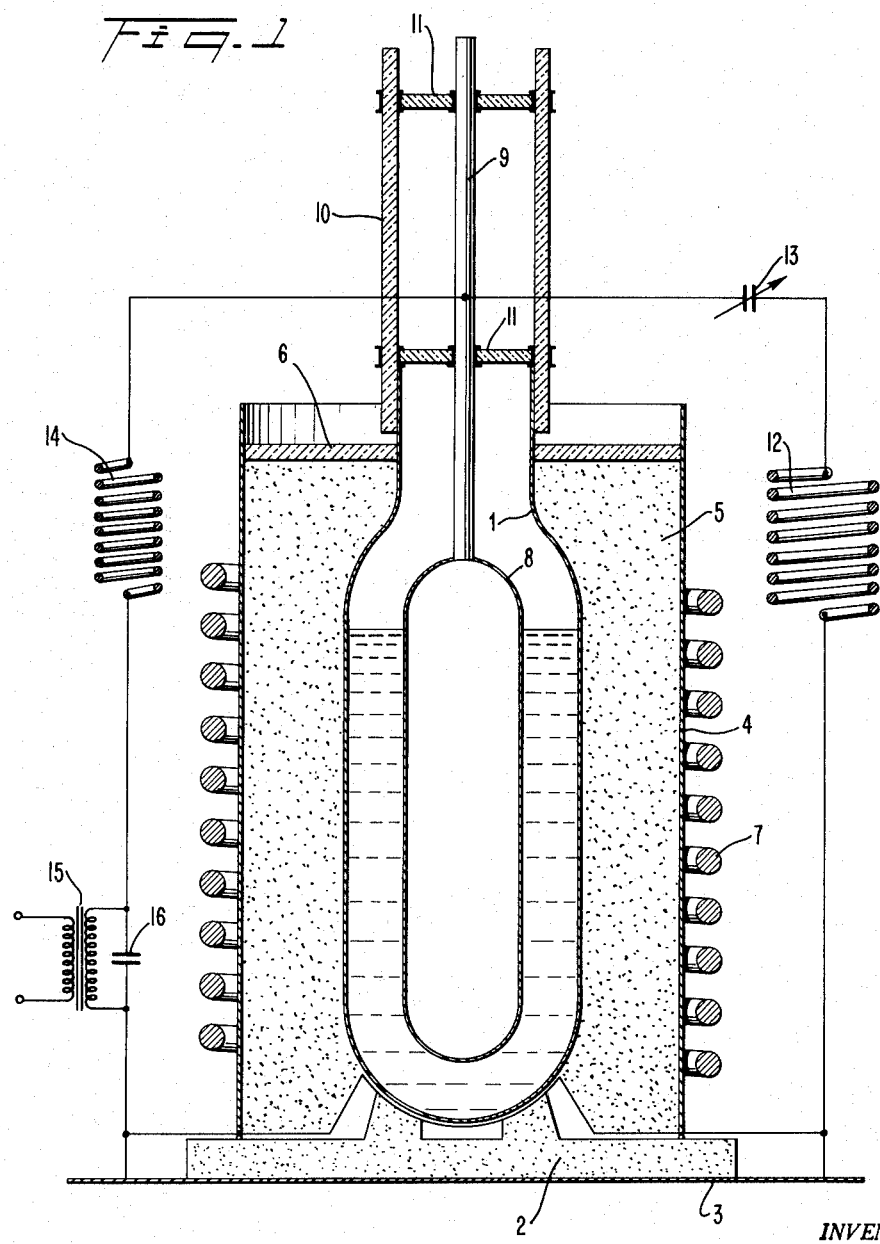

Referring to the numerals, the platinum crucible 1 rests on a stand of refractory material 2 which in turn rests on a metal plate 3 of lowest possible resistivity, preferably at ground potential. The crucible is put inside an envelope 4 from which it is thermally insulated by insulation 5, which may be e.g., 65% by wt. calcined alumina and 35% calcined magnesia. The crucible is held by brace 6 of refractory, electrically non-conductive material. The crucible is preferably heated by induction, the envelope 4 being composed of refractory and insulating material, such as porcelain, steatite, and fused quartz and surrounded by induction coils 7. The coils are connected to a source of high frequency alternating current (at a frequency of several tens to several hundred thousands of hertz) which is not shown. The crucible may also be heated by resistances placed near its surface and served by a transformer connected directly to the power line, in which case the envelope may be metallic.

Inside the crucible is a core 8, also of platinum or of platinum alloy supported from above by a rigid connection 9. Non-conductors 10 which keep their strength and insulating properties at high temperature support the neck of the crucible firmly through braces 11.

Crucible 1 and core 8 are the two plates of a condenser of which the dielectric is made of the crude vitreous mass undergoing heating. For safety and convenience the crucible 1 is at ground potential and the core 8 is connected to the power source (e.g. generator) of very high frequency (between several megahertz and several tens of megahertz according to the size of the crucible). The oscillating circuit in which the condenser, composed of core and crucible, is inserted includes an inductance 12, and a variable condenser 13 which permits the variation of the impedance during different stages of the operation. The crucible and core also are electrodes for Joule effect heating which become useful for that purpose as soon as the crude mass becomes conductive. The heating circuit is provided by connection in parallel to the oscillating circuit of the high frequency generator through an inductance 14 of which the value is chosen so as to present high impedance to the very high frequency of the generator of heating by dielectric loss.

To achieve Joule effect heating with adequate variability the circuit includes transformer 15 the output voltage of which can be varied within large limits by classic means. The secondary of the transformer is shunted through condenser 16 which may be made capable of accepting a weak current from the very high frequency circuit through impedance 14.

The regulation of heating by dielectric loss and by Joule effect are independent whether manual or automatic, the controls in the latter case being set to operate on a time schedule or a temperature schedule as the case might be. In case of a temperature schedule the measurement of temperature is by classic methods, e.g., inserting a pyrometric couple inside the core, being careful to see that the couple is not activated by the very high frequency currents derived or induced. This can be provided by putting the couple inside a grounded Faraday cage while the current source includes a high frequency filter the characteristics of which are a function of the frequency in use.

The crucible 1 is cylindrical or truncated conical, and the core may also be of these shapes. In FIG. 1 the crucible 1 and core 8 are cylindrical with hemispherical ends, in which case the core may be placed on the axis of the crucible and equal spacing be maintained between opposite surfaces of the two. This provides equal heating both by dielectric loss and Joule effect. It is also possible to raise or lower the core in the crucible so as to obtain different temperatures at different levels.

Figure 2:
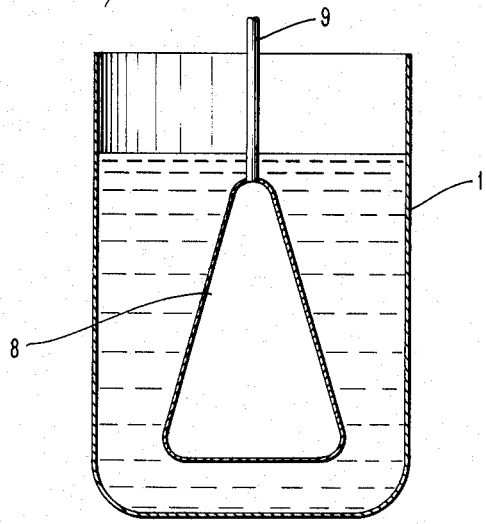
FIGS 2 and 3 are diagrams of the core, illustrating effective shapes.

In FIG. 2 there is a furnace in which the crucible is cylindrical and the core is truncated, the large base being the lower and producing higher heat in the lower levels.

Figure 3:
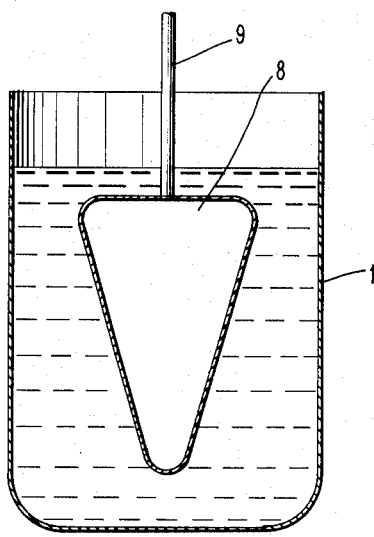

In FIG. 3 the larger base is above and the higher temperature is in the upper levels.

Many variations in shape are available to produce variations in heating effect and location.

These forms of the invention produce high quality glass in shorter time and with less energy expense than other systems, particularly in comparison to a furnace of high frequency induction type. For example, in producing optical glass of standard type the time was cut 50%, 40% less energy was required and mechanical mixing was eliminated.

Figure 4:
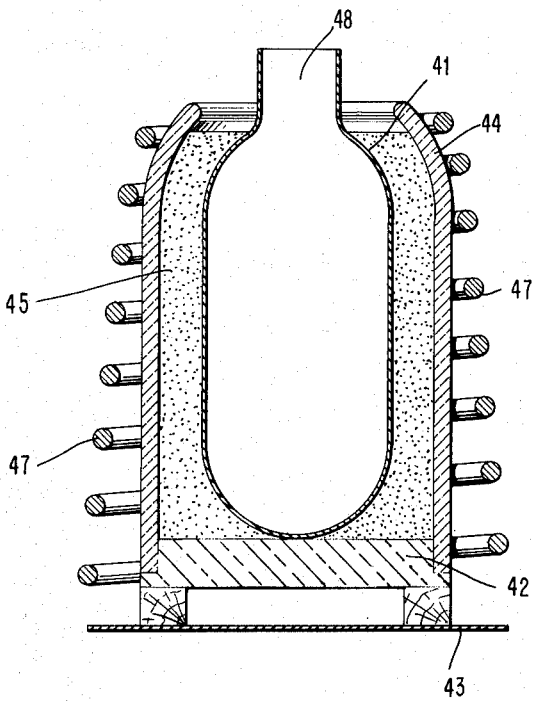
FIG. 4 is a vertical section illustrating a modified form.

In FIG. 4 the platinum crucible 41 stands on a refractory base 42 which rests on a metallic surface 43. A refractory envelope 44 is mounted on the base 42 and has a dome at its upper part of which the profile is parallel to the curve of the crucible. An insulating material 45 fills the space between crucible and envelope. The induction coil 47 is shaped so that the turns are progressively more widely spaced at the bottom and are closer at the top of the crucible, providing greater heat in the upper zone. The coils are also shown as closer to the crucible toward the top.

We have demonstrated that in the case of the making of certain kinds of glass, notably very viscous glass, it is advisable to introduce more heat in the upper part of the bath to compensate for the losses by radiation and to keep the surface glass fluid, thereby making rapid fining possible. The shape of the reflecting dome given to the upper part of the crucible and the reduction in size of the opening 48 to that which is actually essential to loading contribute to the maintenance of higher temperature in the upper than in the lower layers of glass.

A similar result may also be obtained by other variables schematically shown in FIGS. 5 and 6, in which the induction coils 56, 57 are cylindrical as in FIG. 1. As in FIG. 5 one may shunt the lower part of inductance 56 through the inductance 57, the numebr of turns shunted being variable by the displacement of the contact 58 along the induction coil and the optimum value being obtained by the displacement of contact 59.

In FIG. 6 the inductance may be further varied by the displacement of a coaxial cylinder 62 within the coil 57, the cylinder being of very high electrical conductivity, the operation and construction being otherwise like FIG. 5. The cylinder 62 is suspended by a cable 63 over pulleys 64 by the aid of a counter-weight 65.

When the heating of the crucible is by resistances it suffices to place the more powerful heating elements near the upper part of the crucible so as to provide a stronger radiating surface in that location.

FIG. 7 discloses an acceptable construction and location of heating elements for the core 8, which may thus be selectively heated to supply more calories to the upper layers of glass, if desired, or to the glass at any chosen depth, as the case may be. The internal heating resistance includes a plurality of super-imposed resistors 24, 25 coupled in series or parallel. An alumina cylinder 26 fits the side and hemispherical bottom of the core. A second alumina cylinder 28 is seated within the first and includes on its outer face a helical groove in which the resistors 24, 25 are placed, the first being supplied with current by leads 31, 32 and the second by leads 29, 30. The lead 30 is attached to the wall of the core 8, and the other leads 29, 31, 32 are connected to metallic rings 36 which are electrically separated by insulating rings 37 mounted on the end of a platinum tube 22 secured to the top 34 of the core. The lower assembly is mounted in the body of the core and then the upper assembly including the rings is welded to the core along line *a–b*. The rings are connected to contacts in a known manner so as to give the following combinations: use of any coil alone, use of a plurality of coils in series or parallel, use of one or more coils in series with the glass bath, use of more than one in parallel and both in series with the bath.

These different combinations make possible the successive phases for any regimen of glassmaking. In a first stage the two resistors may be connected in series so as to impart maximum heat to the vitrifiable raw materials. As soon as the vitreous mass, first heated by dielectric losses, acquires zones of molten glass capable of carrying current at the low voltage of the line, the resistors are switched into series with the glass bath. Thus the vitreous mass is simultaneously heated by contact with the hot crucible and the hot core, and by dielectric loss, by Joule effect with current limitation imposed by the heating resistance of the central electrode.

As soon as the glass reaches adequate depth the lower resistor may be switched out, leaving the upper resistor in series with the bath. In that case the lower part of the electrode is heated only by contact with the glass bath while the upper part continues to be heated by the upper resistance, which is in series with glass bath. As there is only a single resistor in series the current for Joule effect is constrained within an upper limit of value higher than at the start of the operation, which is explicable by the fact that the volume of glass traversed by the current is greater.

In the final phase the two resistors are connected in parallel, the whole being in series with the bath.

When all the vitreous mass is wholly melted it is not inconvenient to put the resistances in parallel, which results again in limiting the current passing through the glass.

The system of operation as explained above may be ordered by simple instructions based on a limited number of observations, such as the temperatures found at specified places in the mass, the intensity of current passing through the resistors, and the depth of the glass in the crucible.

In FIG. 8 is shown in diagram how one may provide for various combinations of power and treatment of the glass. The single resistance 39 symbolizes the two resistances of FIG. 7. A three place commutator 40 connected to the ends of a transformer 41 provides, in position 2, heating of the core by resistance, in the position 0 the resistances are put in series with the bath, and in the position 3 the heating is by Joule effect to which, it will be understood, the heating by dielectric loss will be added. Putting the resistances in parallel is achieved by connections applied across the rings 36 and produces the final phase described above.

The resistances are of such magnitude that the power they can carry without difficulty is somewhat superior to that which would pass through the glass if the voltage used was taken directly from the leads to the crucible and the core, a condition which should be satisfied for each phase of the operation.

If each of the two resistors could normally carry an intensity of current I, the voltage should be selected so that the current in the bath does not exceed this value when there are in use either the two resistors in series or a single resistor, but reaching 2I when the two resistances are in parallel. This is easily provided when, varying the voltage used, one maintains a given power in the resistors and especially when one heats the bath efficiently by direct passage of current.

Figure 9:
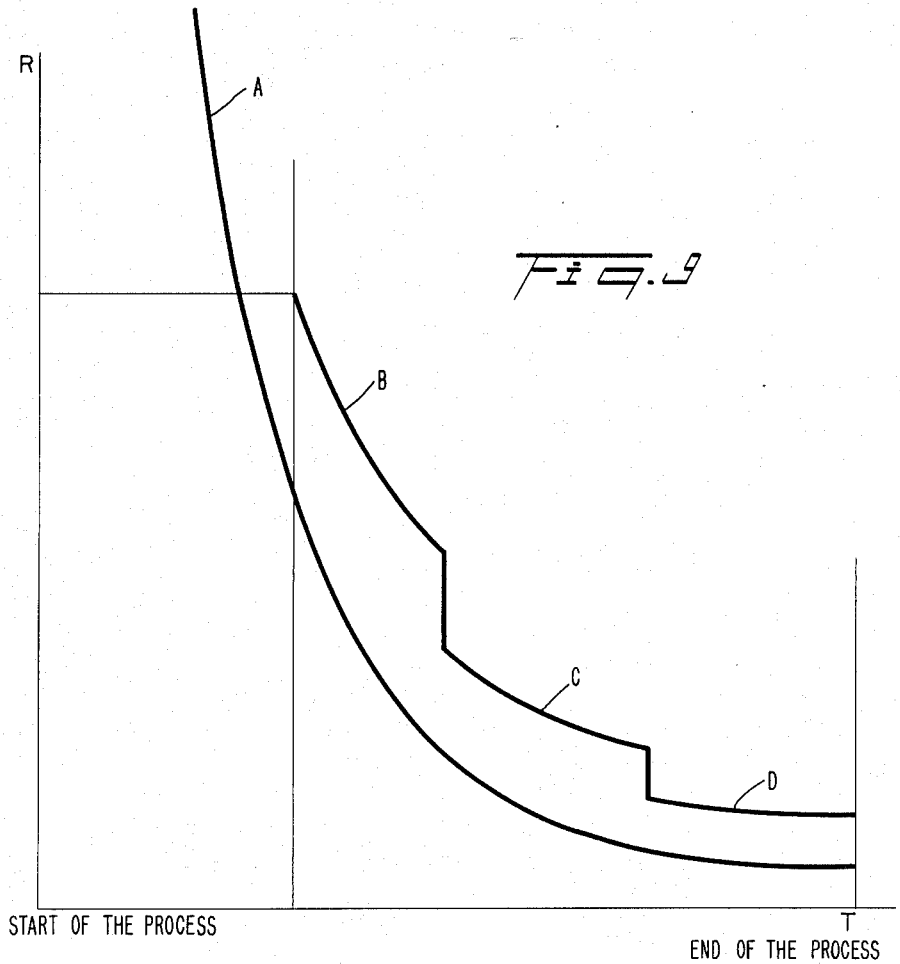
FIGS. 9 and 10 illustrate a regimen for glass production in terms of time (T), resistance (R), and intensity of current (I) in the molten glass.

The diagram of FIG. 9 gives by curve A a general idea of the resistance of the glass mass to the passage of the current of the system during the progress of manufacture, R being resistance plotted against the time T. The curve B, C, D shows at B the effect of putting two resistances in series with each other and in series with the glass mass, at C the effect of putting a single resistor in series with the bath, and at D the effect of putting two resistors in parallel in series with the bath. In phase B, which occurs during the existence of molten glass and solid glass in the bath, the electric conductivity varies widely and there may well appear zones of intense local heat which threaten to degrade the glass, but this effect is overcome by putting two resistors in series with the bath. In phase C a larger part of the glass has been melted, permitting the use of more Joule effect current and for this aim to short-circuit a resistor. In phase D yet more current is supplied for fining, all the solids having been melted at the end of phase C.

Figure 10:
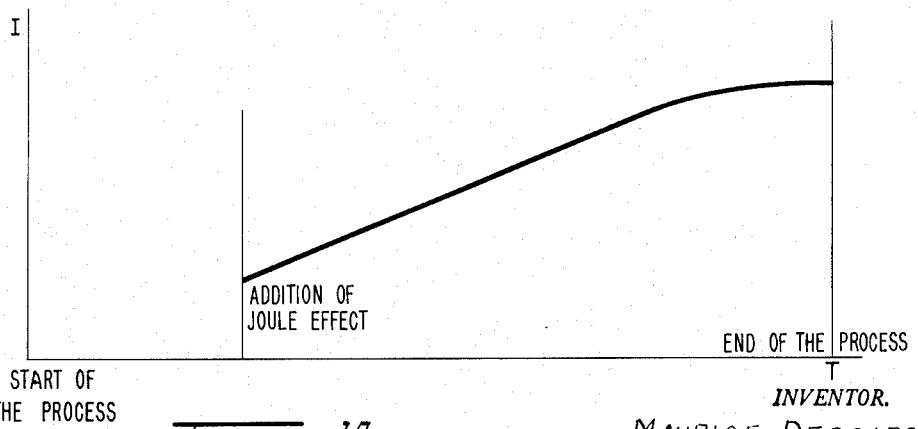

The curve of FIG. 10 shows by way of example the change in the intensity of current in the molten bath beginning at the time when the heating by Joule effect begins and continuing to the end of the process, the preliminary heating being effected by dielectric loss and simultaneously by the heat of the crucible and core.

Figure 11:
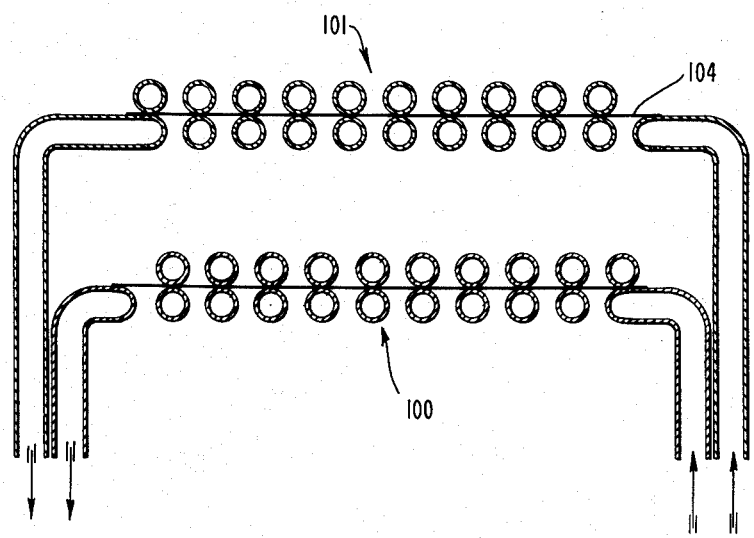
FIG. 11 is a vertical section illustrating a modified form of inductance.

The variable voltage of supply for the resistors and for the glass, may be drawn from a single transformer without interruption of continuity by classic means such as is schematized in FIG. 8. To simplify this system the inductance of FIG. 1 has been eliminated and two resistors coupled in series or parallel have been represented by a single resistance. The inductance may for example be composed of two coaxial coils 100, 101 of substantially the same number of turns. The inner turns of the coils have a potential difference of a few volts from the potential of the outer turns. A thin dielectric 104 (FIG. 11) insulates the inner and outer turns of the coils from each other, as shown.

As many apparently widely different embodiments of the present invention may be made without departing from the spirit and scope thereof, it is to be understood that the invention is not limited to the specific embodiments.

What is claimed is:

1. A method of melting glass from vitrifiable materials, which comprises placing the material to be heated in annular form between two armatures of a condenser, submitting these armatures to a high frequency, high potential difference and thereby heating the material therebetween by dielectric loss until some of the material has become molten and electrically conducting, and further heating the material by Joule effect by passing current radially through the molten part of the material.

2. A method according to claim 1 in which both heating processes by dielectric losses and by Joule effect are used simultaneously.

3. A method according to claim 1 in which the heatings by dielectric losses and by Joule effect are used separately and successively.

4. A method according to claim 1 in which the process is carried out in metal apparatus and a part of the metal is heated by induction.

5. A method according to claim 1 wherein different heating actions are applied to the inner and outer peripheries of the annulus of melting materials, the different heating actions being controlled independently from each other whereby to generate convection currents in the molten mass and produce a stirring action which favors homogenization.

6. A furnace for heating vitreous materials in particular for the manufacture of glass from vitrifiable materials comprising a metallic crucible, a metallic core surrounded by the metallic crucible, electrical power supply means connected to said crucible and said core establishing them as the armatures of a condenser for the heating by dielectrical loss of the material placed between the crucible and core, and electric power supply means connected to the crucible and core constituting them electrodes for the heating of the material by Joule effect.

7. A furnace according to claim 6 in which the crucible and the core are coaxial volumes of revolution.

8. A furnace according to claim 6 in which the crucible and the core are both constituted by axially concentric cylindrical bodies having geometrically similar shape, providing space between crucible and core which is substantially uniform whereby to produce uniform application of heating to the contents.

9. A furnace according to claim 6 in which the crucible is provided at its top with a reflecting dome and with an opening in said dome for the filling of the crucible.

10. A furnace according to claim 6 having induction heating means bearing inductively upon the crucible whereby to heat it.

11. A melting furnace according to claim 6 in which means are provided to vary the heating along the height of the crucible and particularly to obtain a more intense heating in a determined portion of the crucible.

12. A furnace according to claim 11 in which the core is cylindrical and the crucible has a variable cross section along its height, thereby providing for a variation of the high frequency electrical field along the height of the furnace and differential heating of the bath.

13. A furnace according to claim 6 in which the core also contains at least one electrical heating resistor and control means therefor.

14. A furnace according to claim 13 in which means are provided to connect the glass bath in series with the heating resistance of the core.

15. A glass furnace adapted to the production of high quality glass comprising an annular chamber the walls of which consist of condenser plates for heating by dielectric loss and electrodes for heating by Joule effect, insulation surrounding the chamber, and an induction coil surrounding the insulation adapted to heat the chamber walls by induction, and variable electric power means connected to the walls and the coil.

16. A glass furnace according to claim 15 also including an electrical resistance within the space defined by the inner wall of the annular chamber.

17. A glass furnace according to claim 16 in which the annular chamber is enclosed within a refractory envelope provided with a truncated dome providing a measure of heat reflection toward the contents of the furnace and an orifice of admittance and discharge.

18. A furnace according to claim 6 wherein the crucible and the core are so shaped that the distance between their walls varies along the height of the treated material.

19. A furnace according to claim 18 also including adjusting means whereby the core is adjustable in height in relation to the crucible to vary the distribution of the heated effect along the height of the treated material.

20. A glass furnace having an annular melting chamber the walls of which are metallic and constitute Joule effect electrodes, means to pass current radially between the walls, said means including a series of resistances in contact with and connected electrically to said walls, means to place the resistances in series or in parallel with one another and in series with the wall, and current supply means connected to said electrodes constituting them condenser plates for heating the materials therebetween by dielectric loss.

References Cited by the Examiner

UNITED STATES PATENTS

| | | | |
|---|---|---|---|
| 1,572,873 | 2/26 | Allcutt | 219—10.79 |
| 1,781,917 | 11/30 | Drake | 13—6 |
| 2,186,718 | 1/40 | Ferguson | 13—6 |
| 2,385,567 | 9/45 | Descarsin | 219—10.53 |
| 2,600,490 | 6/52 | De Voe | 13—34 |
| 2,643,434 | 6/53 | Scharf | 219—10.41 |
| 2,747,006 | 5/56 | Barnard | 13—6 |
| 2,749,379 | 6/56 | Geffcken et al. | 13—34 |

FOREIGN PATENTS 475,014 11/37 Great Britain.

RICHARD M. WOOD, *Primary Examiner.*

MILTON O. HIRSHFIELD, JOSEPH V. TRUHE, Sr.,
*Examiners.*